(12) United States Patent
Eaton

(10) Patent No.: US 7,587,834 B2
(45) Date of Patent: Sep. 15, 2009

(54) MOTORIZED COORDINATE MEASURING DEVICE

(76) Inventor: Homer L. Eaton, 300 Carlsbad Village Dr., Suite 108A #347, Carlsbad, CA (US) 92008

( * ) Notice: Subject to any disclaimer, the term of this patent is extended or adjusted under 35 U.S.C. 154(b) by 10 days.

(21) Appl. No.: 12/027,935

(22) Filed: Feb. 7, 2008

(65) Prior Publication Data

US 2009/0199421 A1  Aug. 13, 2009

(51) Int. Cl.
*G01B 5/008* (2006.01)
(52) U.S. Cl. .......................................... 33/503
(58) Field of Classification Search .................. 33/503, 33/556, 558
See application file for complete search history.

(56) References Cited

U.S. PATENT DOCUMENTS

| | | | |
|---|---|---|---|
| 2,753,634 | A | 7/1956 | Tamplin |
| 2,801,475 | A | 8/1957 | Meyer, Jr. |
| 2,919,002 | A | 12/1959 | Palmer |
| 3,002,279 | A | 10/1961 | Miller |
| 3,561,125 | A | 2/1971 | Zeidler |
| 3,906,639 | A | 9/1975 | Wilamowski |
| 3,942,253 | A | 3/1976 | Gebel et al. |
| 3,944,798 | A | 3/1976 | Eaton |
| 4,198,943 | A | 4/1980 | Worz |
| 4,587,622 | A | 5/1986 | Herzog |
| 4,679,326 | A | 7/1987 | Takizawa et al. |
| 4,679,331 | A | 7/1987 | Koontz |
| 4,703,443 | A | 10/1987 | Moriyasu |
| 4,727,653 | A | 3/1988 | Fujitani et al. |
| 4,729,174 | A | 3/1988 | Caron et al. |
| 4,819,339 | A * | 4/1989 | Kunzmann et al. ............ 33/503 |
| 4,852,402 | A | 8/1989 | Bertz |

(Continued)

FOREIGN PATENT DOCUMENTS

JP  61-279368  12/1986

(Continued)

OTHER PUBLICATIONS

PCT International Search Report and Written Opinion from corresponding Application No. PCT/US2009/032549.

(Continued)

*Primary Examiner*—G. Bradley Bennett
(74) *Attorney, Agent, or Firm*—Charmasson, Buchaca & Leach, LLP

(57) ABSTRACT

A coordinate measuring device comprises a housing rotatively supported on a base and mounting a vertical pillar along which rides a carriage engaged by a horizontally translating arm. A turret at each end of the arm houses a rotating body connected to a probe. The rotation of the base, the vertical movement of the carriage, the horizontal movement of the arm and the rotation of the probes are driven by motors in the housing. The rotation of the motors are transmitted by a cable and pulley assembly to the arm and carriage. The cable controlling the transversal movement of the arm as its opposite ends attach to the opposite extremity of the arm, and is ran respectively up and down the portion of the pillar above and below the carriage in order to maintain constant lengths and tension of the cables as the carriage moves up and down the pillar. The rotation of the probes and that of the base are coordinated to keep the probes at a constant angle in relation to the measured surface.

23 Claims, 2 Drawing Sheets

U.S. PATENT DOCUMENTS

| | | | |
|---|---|---|---|
| 4,889,519 A | 12/1989 | Band et al. | |
| 4,910,446 A | 3/1990 | McMurtry et al. | |
| 4,961,267 A | 10/1990 | Herzog | |
| 4,964,221 A | 10/1990 | Breyer et al. | |
| 4,976,043 A | 12/1990 | Bieg | |
| 5,063,334 A | 11/1991 | Tanita et al. | |
| 5,131,166 A | 7/1992 | Weber | |
| 5,134,782 A | 8/1992 | Breyer et al. | |
| 5,148,377 A | 9/1992 | McDonald | |
| 5,198,990 A | 3/1993 | Farzan et al. | |
| 5,309,646 A | 5/1994 | Randolph, Jr. et al. | |
| 5,758,429 A | 6/1998 | Farzan et al. | |
| 5,829,148 A | 11/1998 | Eaton | |
| 6,163,973 A * | 12/2000 | Matsumiya et al. | 33/559 |
| 6,236,876 B1 | 5/2001 | Gruner et al. | |
| 7,293,365 B2 * | 11/2007 | McMurtry et al. | 33/556 |
| 2002/0000047 A1 * | 1/2002 | Yoda et al. | 33/503 |
| 2002/0029485 A1 * | 3/2002 | Petterson | 33/503 |
| 2005/0235512 A1 * | 10/2005 | Mies | 33/556 |
| 2009/0013549 A1 * | 1/2009 | Lutz | 33/503 |

FOREIGN PATENT DOCUMENTS

| | | |
|---|---|---|
| KR | 100288510 | 2/2001 |
| KR | 100395440 | 8/2003 |

OTHER PUBLICATIONS

Kanesaka & Sakai, English translation of bibliographic information for Japan Patent Publication No. 61-279368 (listed above).

Korean Patent Abstracts, English translation of bibliographic information and abstract for Korea Patent Publication No. 100288510 (listed above).

Korean Patent Abstracts, English translation of bibliographic information and abstract for Korea Patent Publication No. 100395440 (listed above).

* cited by examiner

MOTORIZED COORDINATE MEASURING DEVICE

FIELD OF THE INVENTION

This invention relates to apparatuses for determining the coordinate values of a point on a workpiece, and relates more specifically to mechanisms for positioning a probe mounted on an articulated, complex coordinate arm.

BACKGROUND

Coordinate measuring apparatuses are commonly used in many industries to analyze the contour of a workpiece or to verify manufacturing compliance with specifications. In a first type of apparatus, a probe is mounted on an articulated, multi-axis measurement arm. The probe is manually brought in contact with a point on a workpiece to verify its Cartesian coordinates. The probe can also be dragged along a contoured surface in order to determine its spherical or cylindrical coordinates. Digital encoders installed within each articulation of the arm generate orientation signals that are fed to a data processor which extracts from those signals the desired coordinate values. An example of this first type of coordinate measuring apparatus is disclosed in my U.S. Pat. No. 5,829,148 incorporated herein by this reference.

In a second type of coordinate measuring apparatus, the probe mounted on a multi-axis adjustable support is automatically driven into contact with the workpiece by computer-controlled motors which directs the movement of various structural elements of the apparatus that are orthogonally oriented in reference to one another. Optical or tactile sensors mounted within the probe stop the movement of the pillars or arms when contact with the workpiece is established. An example of this second type of coordinate measuring apparatus is disclosed in U.S. Pat. No. 5,134,782 incorporated herein by this reference.

Due to the multiple components, particularly moving parts, present in the first type of coordinate measuring machine, high precision is seldom achieved. This type machine is also particularly sensitive to temperature variations. The second type of coordinate measuring machine tend to be sturdier, have a limited number of coordinate-transferring parts and, accordingly, can provide higher precision. However, they are also bulkier, heavier and more complex.

The instant invention results from an attempt to devise a lightweight, yet precise coordinate measuring device by taking advantage of new material having improved capabilities.

SUMMARY

The invention directs a measuring probe by the translation of some supporting components along two orthogonal axis and by the rotation of a base component. The components are maneuvered by cable and pulley mechanisms driven by electrical motors under the control of a data processor. A complex routing of the cables automatically accommodates for the displacement of the primary moving elements without affecting the positioning of the secondary element more remotely positioned on the machine.

In some embodiments, there is provided a coordinate measuring device thus comprises a stationary base, a housing rotatively supported on said base about a first, Z axis, a pillar mounted on the housing and extending along the Z axis, a carriage translatable along, and supported by said pillar, a horizontal cross-arm slidingly engaged upon the carriage, translatable about a second, Y axis and having opposite first and second extremities, an electro-mechanical assembly in the housing, the assembly including a plurality of driving means and means for linking said driving means to the translatable carriage and sliding cross-arm, and at least one probe mounted at said first extremity.

In some embodiments the electro-mechanical assembly comprises a plurality of motors, each of the motors having a driving pulley, a plurality of direction-altering pulleys associated with the pillar and carriage, and flexible, elongated elements engaging the pulley to translate the carriage up and down the pillar and bilaterally translate the arm about the carriage.

In some embodiments the assembly further comprises a motorized mechanism for rotating the housing and pillar about the Z axis.

In some embodiments the probe comprises a turret secured to said first extremity, a body within the turret, the body being rotatable about a vertical third, Z' axis, and a sensing element attached to the body.

In some embodiments the electro-mechanical assembly further comprises, a supplemental motor in the housing, and a cable and pulley mechanism for linking the motor to the body.

In some embodiments the device further comprises encoding means for indicating the linear position of the carriage along said Z axis, the linear position of the arm along said Y axis, the angular position of the housing in relation to the base and the orientation of the body.

In some embodiments the sensing element comprises a shaft coupled at a first end to the body and a sensor mounted to the body at an opposite end.

In some embodiments the shaft projects in a direction parallel to and spaced apart from said Z' axis.

In some embodiments the device further comprises a control unit including means for activating the motors and for positioning the probe in contact with at least one point on a workpiece surface.

In some embodiments the sensor comprises an imaging apparatus; and the control unit further comprises means for activating the motor and for positioning said imaging apparatus proximate a point on said surface.

In some embodiments the device further comprises a second probe secured to the second extremity of the arm.

In some embodiments the device further comprises a control unit including means for activating said motors and for positioning said probe in contact with at least one point on a workpiece surface.

In some embodiments the control unit further comprises means for coordinating said orientation and said angular position.

In some embodiments the means for coordinating comprise means for adjusting the angular position of the shaft in relation to said surface.

In some embodiments the means for controlling further comprises means for running the probe along a path on said surface.

In some embodiments the mean for controlling further comprises means for intermittently positioning the probe on a series of discrete points on said surface.

In some embodiments the means for intermittently positioning comprises means for alternately and bidirectionally rotating said body over an arc of less than 180 degrees.

In some embodiments the elongated element comprises cables made of synthetic plastic material.

In some embodiments the encoding means comprise linear and circular indexers and optical detector; and the second controlling means comprise servo systems responsive to said encoding means.

In some embodiments a first of said flexible elongated elements comprises a cable secured at both ends to the carriage and engaging a first direction-altering pulley in an upper region of the pillar, a second direction-altering pulley in a lower region of the pillar and pulley driven by a first of said motors.

In some embodiments a second of said flexible elongated elements comprises a cable secured at opposite ends to said first and second extremities respectively, running up and down portions of the pillar above and below the carriage, and engaging a pulley driven by a second of said motors.

In some embodiments the cable and pulley mechanism operating each of the rotating bodies comprises a close-loop cable running up and down portions of the pillar above and below said carriage.

In some embodiments there is provided a coordinate measuring device which comprises: a stationary base; a housing rotatively supported on said base about a first axis; a pillar mounted on said housing and extending along said first axis; a carriage translatable along, and supported by said pillar; a cross-arm slidingly engaged upon said carriage, translatable about a second axis and having opposite first and second extremities; an electro-mechanical assembly in said housing, said assembly including a plurality of drives and linkages linking said drives to said translatable carriage and sliding cross-arm; and, at least one probe mounted at said first extremity.

DESCRIPTION OF THE PREFERRED EMBODIMENT(S)

Figure 1:
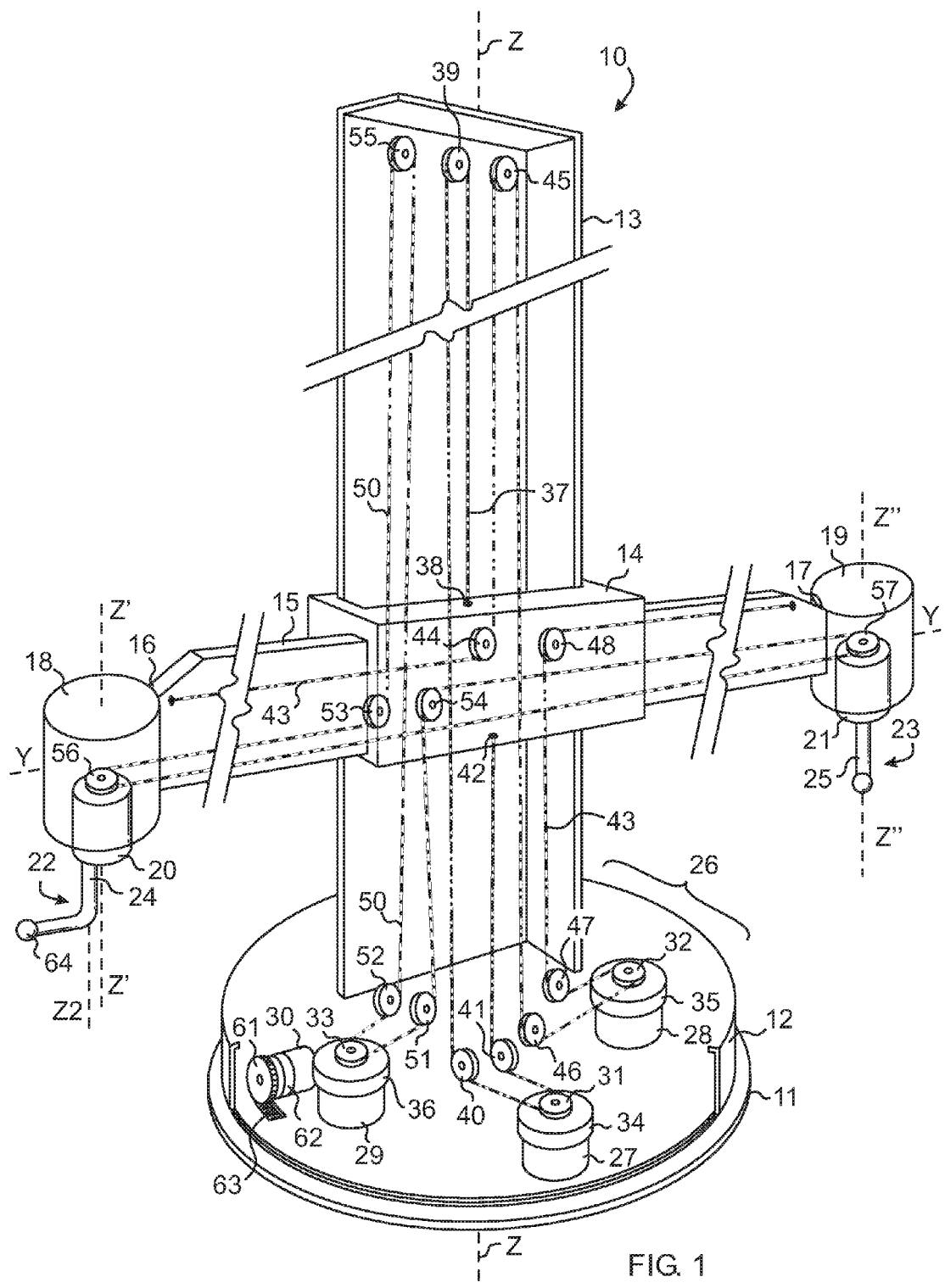
FIG. 1 is a diagrammatical, perspective illustration of the primary mechanical elements of a coordinate measuring apparatus according to the invention.

Referring now to the drawing, there is shown in FIG. 1 a coordinate measuring device 10 which comprises a stationary base 11 upon which is rotatively mounted a housing 12 about a first axis Z. A hollow tubular pillar 13 secured to the top of the housing extends vertically coaxially with the housing. A carriage 14 is supported by the pillar and can be translated vertically along the length of the pillar. An horizontal hollow tubular cross-arm 15 is engaged into the carriage and can be translated bi-directionally along a second, horizontal axis Y. Secured to each extremity 16,17 of the arm is a turret 18,19 housing a body 20,21 rotating about a third, vertical axis Z',Z". A tactile probe 22,23 has a shaft 24,25 snapped into the lower end of the rotating body 20,21. An electro-mechanical assembly 26 in the housing 12 is linked to the carriage 14, the cross-arm 15 and to the rotating bodies 20,21 by a series of cables and pulleys forming linkages to motor drives. The electro-mechanical assembly 26 includes four electrical motors 27,28,29,30. Three of the motors 27,28,29 drive pulleys 31,32,33 either directly or through speed reducers 34,35,36 depending on the type of motors selected.

The first motor 27 controls the up-and-down movement of the carriage 14. A cable 37, made from a synthetic plastic material such as SPECTRA brand high molecular weight polyethylene fiber available from Honeywell International Inc., of Morristown, N.J., is connected at a first end to a part 38 of the carriage. The cable extends vertically inside the pillar 13 up to its top section where it passes over a pulley 39 which alters the cable's direction downward toward the bottom section of the pillar where its direction is altered to a horizontal position by another pulley 40 the cable then engages the motor pulley 31. From another direction-altering pulley 41, the cable rises upwardly toward the carriage where it is secured at its opposite end to another part 42. It will be understood that when the first motor 27 is activated, depending upon its direction of rotation, the carriage 14 will be translated up or down the length of the pillar 13.

The second motor 28 controls the bi-directional translation of the arm 15 with respect to the carriage by way of a second cable 43. The cable 43 is attached at a first end to a first extremity 16 of the arm, then engages a direction-altering pulley 44 and ascends within the pillar toward its top region where it engages another direction-alternating pulley 45 before descending down into the housing 12. There, after engaging a third direction-alternating pulley 46 it engages pulley 32 driven by the second motor 28. The cable 43 is then directed by pulley 47 toward the carriage 14 where a sixth pulley 48 directs it towards the other extremity 17 of the arm where its opposite end is attached. It should be noted that by having the cable 43 run up and down the portions of the pillar located above and below the carriage 14, the cable remains taut and the translational position of the arm can remain fixed during movement of the carriage along the pillar 13.

The third motor 29 controls the orientation of the rotating bodies 20, 21 by way of a third cable 50. The cable 50 forms a continuous closed loop and is engaged by a pulley 33 associated with the motor 29, and is directed by the direction-altering pulleys 51,52,53,54 and 55 toward pulleys 56 and 57 associated with the rotating bodies 20, 21 respectively. It is important to note that by having the cable 50 run up and down the pillar 13 through the series of pulleys according to a scheme similar to that used in connection with the control of the arm 15, the cable 50 remains taut and the rotational positions of the rotating bodies 20 and 21 can remain fixed during movement of the carriage 14 along the pillar 13.

The fourth motor 30 drives a gear 61 through a speed reducer 62 if necessary. The gear 61 meshes with a track 63 in the base 11 causing the housing 12 and pillar to rotate about the vertical axis Z. It should be noted that the axles of pulleys 44, 48, 53, and 54 are secured to the carriage 14. Pulleys 40, 41, 46, 47, 51, and 52 can be mounted on axles secured to the housing 12 or to the pillar 13.

The axis Z2 of the probe shaft 24 is preferably parallel and slightly spaced apart from the axis Z' of the rotating body 20 and pulley 55. By oscillating the rotating movement of the third motor 29 over an arc of less than 180 degrees, the tip 64 of the probe 22 can be imparted with a vibrating motion which allows for the measurement of a plurality of discrete points on the surface of a workpiece as the probe is driven along a path on said surface.

It is important to note the driven movement of the carriage, arm, and rotating bodies occurs in absence of any driving motors located in the carriage, arm, or rotating bodies themselves, thus eliminating the weight and heat sources of motors and power supply lines in these structures. In this way the device, in some embodiments, can be made to weigh less than 12 kilograms, and be battery powered, and thus portable, while still providing up to a 5500 cubic centimeter measuring volume, and 5 micron far range accuracy, and 2 micron near range accuracy.

Figure 2:
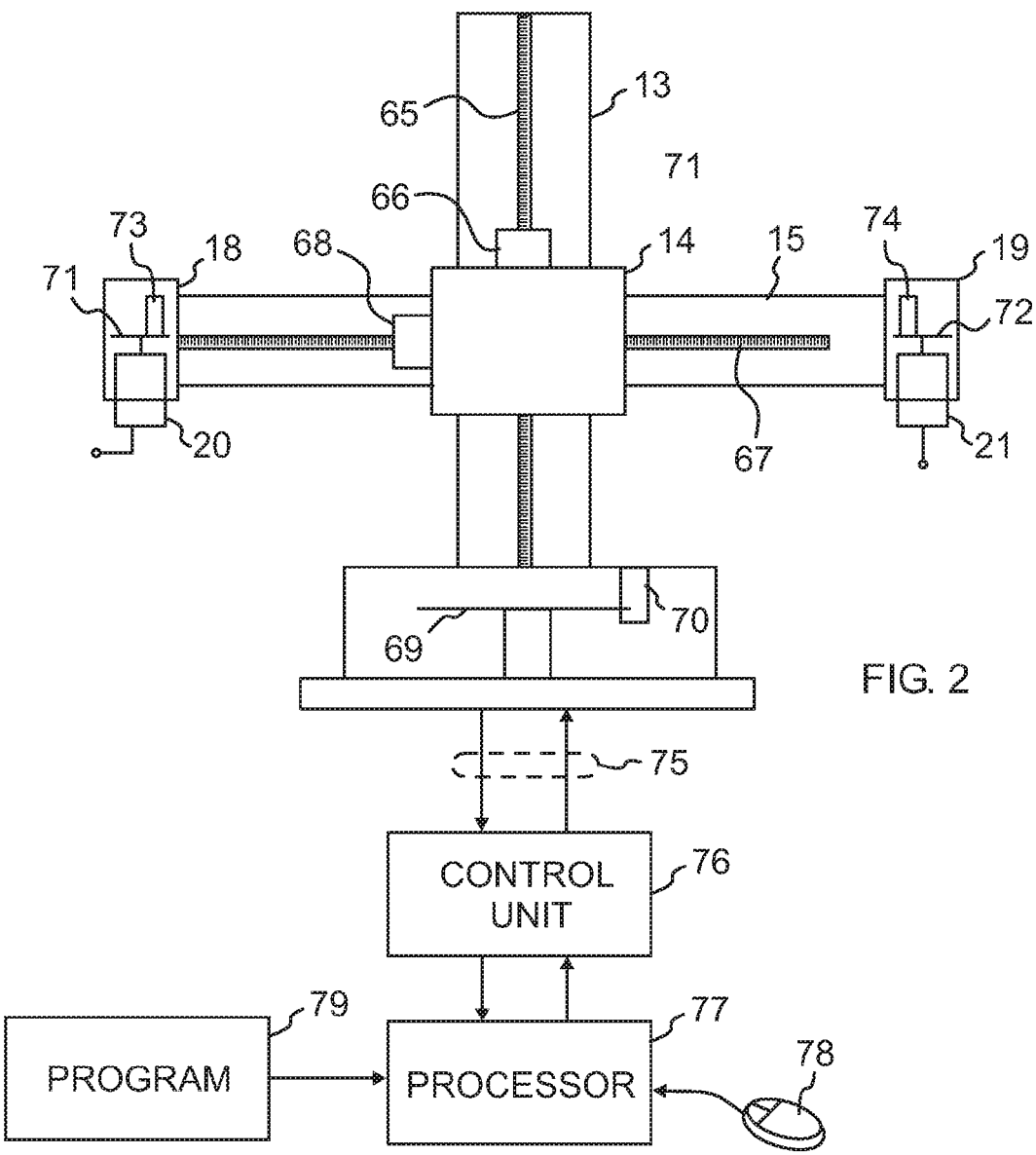
FIG. 2 is a diagrammatical illustration of the entire apparatus.

Referring now to FIG. 2, a first linear scale 65 positioned along the length of the pillar 13 is read by a first optical detector 66. A second scale 67 along the cross-arm 15 is read by a second optical detector 68. Both detectors are mounted on the carriage 14. An optical disk 69 associated with the base 11 is read by a third optical sensor 70 associated with the housing 12. Similar optical disks 71,72 associated with the rotating bodies 20, 21 are read by optical sensors 73,74 associated with the turrets 18 and 19. Signal conductors 75 from the various sensors and detectors and to the motors are connected to a control unit 76 which includes all the electronic and servo-system assemblies necessary to energize and direct the movement of the motors in response to the signals received from the various detectors and sensors, and the commands generated by an automatic data processor 77. The processor responds to signals provided by a manual entry device 78 or responds to instructions defining measurement routines provided by computer programs 79. Accordingly, either one of the probes can be directed to contact any surface within the reach of the device and to provide accurate coordinates of any point contacted by any one of the probes on a workpiece.

Figure 3:
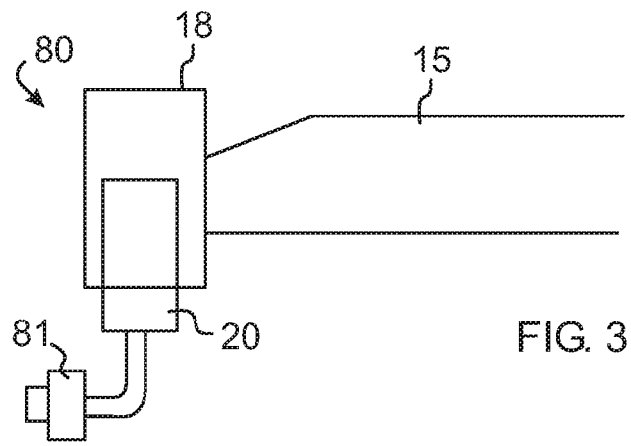
FIG. 3 is diagrammatical illustration of an imaging probe.

In an alternate embodiment of the probe illustrated in FIG. 3, the tactile sensor of the previous embodiment is replaced by a camera or other imaging device. The image signal generated by the camera are fed to the processor operating under an image recognition computer program.

It should be understood that the mechanical linkage between the motors and the carriage, cross-arm and rotating bodies could be implemented by means of meshing gears, chains, and other obviously equivalent elements.

While the preferred embodiment of the invention has been described, modifications can be made and other embodiments may be devised without departing from the spirit of the invention and the scope of the appended claims.

What is claimed is:

1. A coordinate measuring device which comprises:
   a stationary base;
   a housing rotatively supported on said base about a first axis;
   a pillar mounted on said housing and extending along said first axis;
   a carriage translatable along, and supported by said pillar;
   a cross-arm slidingly engaged upon said carriage, translatable about a second axis and having opposite first and second extremities;
   an electro-mechanical assembly in said housing, said assembly including a plurality of driving means and means for linking said driving means to said translatable carriage and sliding cross-arm; and
   at least one probe mounted at said first extremity.

2. The device of claim 1, wherein said assembly comprises:
   a plurality of motors, each of said motors having a driving pulley;
   a plurality of direction-altering pulleys associated with said pillar and carriage; and flexible, elongated elements engaging said pulley to translate said carriage up and down said pillar and bilaterally translate said arm about said carriage.

3. The device of claim 2, wherein assembly further comprises a motorized mechanism for rotating said housing and pillar about said first axis.

4. The device of claim 2, wherein said at least one probe comprises:
   a turret secured to said first extremity;
   a body within said turret, said body being rotatable about a third axis; and
   a sensing element attached to said body.

5. The device of claim 4, wherein said assembly further comprises:
   a supplemental motor in said housing; and
   a cable and pulley mechanism for linking said motor to said body.

6. The device of claim 5, which further comprises encoding means for indicating the linear position of said carriage along said first axis, the linear position of said arm along said second axis, the angular position of said housing in relation to said base, and the orientation of said body.

7. The device of claim 4, wherein said sensing element comprises a shaft coupled at a first end to said body and a sensor mounted at an opposite end.

8. The device of claim 7, wherein said shaft projects in a direction parallel to and spaced apart from said third axis.

9. The device of claim 6, which further comprises a control unit including means for activating said motor and for positioning said probe in contact with at least one point on a workpiece surface.

10. The device of claim 7, wherein said sensor comprises an imaging apparatus; and
    said control unit further comprises means for activating said motor and positioning said imaging apparatus proximate a point on said surface.

11. The device of claim 1, which further comprises a second probe secured to the second extremity of said arm.

12. The device of claim 8 which further comprises a control unit including means for activating said motors and for positioning said probe in contact with at least one point on a workpiece surface.

13. The device of claim 12, wherein said control unit further comprises means for coordinating said orientation and said angular position.

14. The device of claim 13, wherein said means for coordinating comprise means for adjusting the angular position of said shaft in relation to said surface.

15. The device of claim 12, wherein said means for controlling further comprises means for running said probe along a path on said surface.

16. The device of claim 12, wherein said mean for controlling further comprises means for intermittently positioning said probe on a series of discrete points on said surface.

17. The device of claim 16, wherein said means for intermittently positioning comprises means for alternately and bidirectionally rotating said body over an arc of less than 180 degrees.

18. The device of claim 2, wherein said elongated element comprises cables made of synthetic plastic material.

19. The device of claim 6, wherein said encoding means comprise:
    linear and circular indexers and optical detector; and
    second controlling means which comprise servo systems responsive to said encoding means.

20. The device of claim 2, wherein a first of said flexible elongated elements comprises a cable secured at both ends to said carriage and engaging a first direction-altering pulley in an upper region of said pillar, a second direction-altering pulley in a lower region of said pillar and pulley driven by a first of said motors.

21. The device of claim 2, wherein a second of said flexible elongated elements comprises a cable secured at opposite ends to said first and second extremities respectively, running up and down portions of said pillar above and below said carriage, and engaging a pulley driven by a second of said motors.

22. The device of claim 5, wherein said cable and pulley mechanism comprises a close-loop cable running up and down portions of said pillar above and below said carriage.

23. A coordinate measuring device which comprises:
- a stationary base;
- a housing rotatively supported on said base about a first axis;
- a pillar mounted on said housing and extending along said first axis;
- a carriage translatable along, and supported by said pillar;
- a cross-arm slidingly engaged upon said carriage, translatable about a second axis and having opposite first and second extremities;
- an electro-mechanical assembly in said housing, said assembly including a plurality of drives and linkages linking said drives to said translatable carriage and sliding cross-arm; and
- at least one probe mounted at said first extremity.

* * * * *